United States Patent [19]

Zahid

[11] 4,108,209

[45] Aug. 22, 1978

[54] SILENT-ACTING HYDRAULIC ACCUMULATOR DEVICE

[75] Inventor: Abduz Zahid, Los Angeles, Calif.

[73] Assignee: Greer Hydraulics, Inc., Los Angeles, CA

[21] Appl. No.: 790,324

[22] Filed: Apr. 25, 1977

[51] Int. Cl.² .................... F16L 55/00
[52] U.S. Cl. .................... 138/30
[58] Field of Search .................... 138/30; 251/358, 360, 251/363

[56] References Cited

U.S. PATENT DOCUMENTS

| | | | |
|---|---|---|---|
| 2,604,118 | 7/1952 | Greer | 138/30 |
| 2,804,884 | 9/1957 | Knox | 138/30 |
| 3,138,176 | 6/1964 | Mercier | 138/30 |
| 3,948,287 | 4/1976 | Sugimura et al. | 138/30 |
| 4,069,844 | 1/1978 | Zahid | 138/30 |

FOREIGN PATENT DOCUMENTS

| | | | |
|---|---|---|---|
| 1,438,865 | 4/1966 | France | 138/30 |

*Primary Examiner*—Charles E. Phillips
*Attorney, Agent, or Firm*—Arthur B. Colvin

[57] ABSTRACT

The present invention is directed to a hydraulic accumulator-pulsation dampener device characterized by the valve component acting in a noiseless manner upon seating and unseating thereof, and further characterized by the valve member being readily replaceable.

3 Claims, 3 Drawing Figures

SILENT-ACTING HYDRAULIC ACCUMULATOR DEVICE

BACKGROUND OF THE INVENTION

1. Field of the Invention

The present invention is in the field of pressure accumulator devices and is directed more particularly to a device of the type described wherein little or no sound is generated by the seating and unseating of the valve member.

2. The Prior Art

Hydraulic accumulator devices (such description to include pulsation dampeners) commonly include a pressure vessel or shell having a gas charging port at one end and an oil port at the other end. An elastomeric bladder member divides the vessel into two chambers communicated, respectively, with the gas and oil ports.

The oil port is connected to a source of hydraulic fluid or the like which is subjected to intermittent periods of high and low pressure. The gas chamber is charged with a quantity of gas under pressure. When the pressure in the gas chamber sufficiently exceeds pressure in the oil chamber, the bladder is distended to the point where the bladder seals the oil port. By virtue of the readily ruptured nature of the material of which the bladder is made, some form of protection is desirably afforded to those portions of the bladder which contact the oil port, to prevent the bladder from being extruded therethrough.

Heretofore it has been proposed to form the bladder with a thickened tip portion in the area in registry with the oil port, whereby, upon expansion of the bladder, the thickened and hence tougher portion of the bladder will contact the port. A representative example of a pressure vessel employing such construction is embodied in U.S. Pat. No. 3,433,268 wherein an elastomeric bladder includes a sealing portion, said portion being rigidified by a metallic stiffener molded into the end of the bladder. It will be readily recognized that bladders of the type described are expensive to manufacture and their replacement requires complete disassembly of the pressure vessel.

It has further been established that upon repetitive seatings and unseatings of the valve, the elastomeric material will ultimately be compromised, to define a leakage path across the valve, with the result that the entire bladder assembly must thereafter be replaced at substantial cost.

In a construction shown by way of example in U.S. Pat. No. 2,604,118, there is disclosed a hydraulic accumulator assembly wherein the wear problem of the valve portion is solved by the provision of a metallic valve member either bonded directly to the bladder or screw threadedly connectible to the bladder.

Both of the embodiments disclosed in said patent are disadvantageous in environments where sudden pressure drops in the hydraulic line may be experienced since the seating of the valve component is accompanied by a substantial metal-against-metal impact, with the production of a loud noise and the transmission of vibration throughout the hydraulic system.

While there is proposed in one embodiment a replacement valve member which may be threadedly connected to the bladder, the form of connector suggested in said patent involves the provision of a through-going aperture in the bladder, with a threaded member being located to one side of the aperture, the valve incorporating a complemental threaded component received in the internally threaded member, reliance being placed upon the tightening of the threaded components to seal the aperture in the bladder.

It has been discovered that such arrangement is disadvantageous in that ultimately gas leakage through the aperture of the bladder is experienced. Also, replacement of the valve member presupposes access both to the valve at one side of the bladder and the insert at the other side of the bladder, so that sufficient relative torsional forces may be developed clampingly to seal the aperture of the bladder.

SUMMARY OF THE INVENTION

The present invention may be summarized as directed to an improved hydraulic accumulator-pulsation dampener device characterized by silence of operation when the valve is seated and unseated on the valve seat disposed at the oil port, the device being further characterized by ready replaceability of the moving valve member without requiring a complete disassembly of the device.

The apparatus includes a bladder member having an insert with a downwardly projecting threaded shank molded integrally thereinto at a portion in registry with the valve seat, the insert opening to the oil chamber, with the cavity in which the insert is housed free from any through-going aperture across the boundary defined by the bladder.

A valve member of elastomeric material likewise includes a cavity within which is positioned an insert member having an internally threaded aperture adapted to receive the threaded shank in the insert carried by the bladder. The valve, in essence, defines an elastomeric shell for a metallic insert.

The valve member includes a spaced pair of bores extending through the shell and into the metallic insert from the bottom or valve defining portion thereof, the bores being disposed symmetrically with respect to the axis of the threaded shank whereby the bores may be used as a means of transmitting torque to the valve member to facilitate mounting and demounting thereof for replacement.

Since there is no metal-to-metal contact upon seating of the valve, the device is soundless in operation.

It is accordingly an object of the invention to provide an improved pressure accumulator device characterized by a readily replaceable valve defining member which can be mounted and demounted without complete disassembly of the device.

A further object of the invention is the provision of a device of the type described which is essentially soundless in its operation.

Still a further object of the invention is the provision of a device of the type described wherein the elements are so configurated and arranged that a primary seal is effected by the valve and a secondary annular seal surrounding the primary seal is effected by elements of the bladder assembly contacting the valve seat.

To attain these objects and such further objects as may appear herein or be hereinafter pointed out, reference is made to the accompanying drawings, forming a part hereof, in which.

Figure 1:
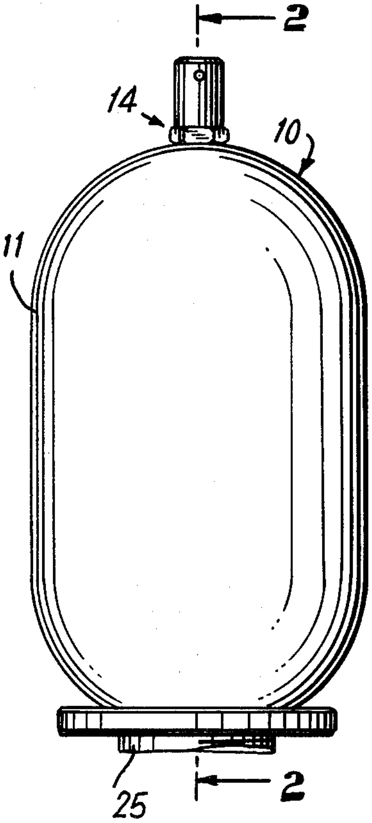
FIG. 1 is a front elevational view of an accumulator device in accordance with the invention.

Making reference to the drawings, there is shown in FIG. 1 a hydraulic accumulator 10 including a pressure vessel 11 having a gas charging port 12 at its upper end, and an oil port 13 at its lower end.

The gas charging port 12 includes a valve assembly 14 which may be of the Schrader type and include a valve body 15 having a radially extending flange 16 adjacent the innermost end thereof. Flange 16 extends into an annular recess 17 at the upper end of a bladder assembly 18 formed of a distensible elastomeric material. The valve assembly 14 is maintained in position by a locking nut 19 mounted over the threaded shank 20 of the body 15, it being appreciated that the valve assembly thus seals the gas port 12 and also defines a mounting mechanism for supporting the bladder.

The bladder includes a gas charging passage 21 which registers with the axially directed passage 22 in the insert 15, providing a means for introducing gas under pressure into the interior of the bladder assembly 18.

Various means for mounting the bladder and numerous variations of the gas charging valve assembly 14 other than those depicted in the illustrated embodiment may be suitably employed. As the noted details form no part of the instant invention, a further description thereof will not be undertaken.

It will be recognized that the bladder assembly 18 divides the interior of the pressure vessel 11 into two chambers, notably gas chamber 23 and oil chamber 24, the volume of the respective chambers varying in accordance with the pressure in the oil line 25 connected to the oil port 13. When the pressure in the oil chamber 24 is greater than that in the gas chamber 23, the bladder will be caused to contract, compressing the gas until an equalization is achieved. When the pressure in the oil line 25 is reduced, expanding gas in the chamber 23 will cause the bladder to distend, whereby the entire volume interiorly of the pressure vessel will be defined by the chamber 23, and the valve assembly 26 will be caused to be pressed against valve seat 27 in plug assembly 28 secured within the oil port.

The plug assembly 28 includes a cylindrical fixture having a threaded shank 29, tapered valve seat 27, and a radially projecting flange 30. The external diameter of the flange 30 is sufficiently smaller than the internal diameter of the oil port 13 to permit its insertion therethrough.

The plug assembly 28 is preferably mounted over a locking assembly 31, known per se and comprising an annular elastomeric retaining ring 32, within which ring is supported a pair of rigid, arcuate metallic segments 33. Each of the segments extends approximately through an arc of 180° whereby the ring 32 may be folded about a fold line coinciding with the junction of the end portions of the segments, permitting the locking assembly 31 to be inserted into the interior of the pressure vessel through the oil port 13.

The plug assembly 28 is maintained in the oil port by first inserting the locking assembly 31 in position in the manner set forth, and thereafter passing the flange 30 of the plug upwardly into the interior of the vessel, whereupon the ring 32 is stretched and the flange passed upwardly through the stretched ring until the downwardly directed shoulder 34 of the flange overlies the upwardly facing shoulder 35 of the segments 33. A seal is effected about the plug by an O-ring 36 which surrounds the shank of the plug, the O-ring being sandwiched between washers 37, 38.

Locking sleeve 39 includes an upwardly directed compression ridge 40 extending into the space between the oil port 13 and the outer diameter portion 41 of the plug. A locking nut 42 is threadedly mounted over the portion 29 of the shank of the plug assembly to clamp the plug assembly into position within the oil port and compress the O-ring 36 to effect the desired seal.

The means for mounting the plug are known per se, and it will be readily understood that alternative methods may be employed for such purpose.

The principal contribution of the instant invention resides in the valve assembly 26, next to be described.

The valve assembly includes an insert member 43 molded in situ or bonded into a downwardly directed recess formed in a thickened portion at the lower end 44 of the bladder assembly 18. The insert 43 includes a radially directed flange 45 lying within an undercut groove 46 of the recess.

A replaceable valve 47 includes a generally frustoconic elastomeric shell member having an upper major base portion 48, a lower minor base portion 49, and tapered side wall portion 50, the inclination of the side wall portion 50 being such as to mate complementally with the beveled wall portion 27 of the valve seat.

The valve member 47 includes an internal cavity 51, within which is mounted a metallic insert member 52. The insert member 52, which preferably may be molded in situ in the course of formation of the shell, includes a radially directed flange 53 extending into an annular recess 54 of the shell. The insert member 53 includes an axial blind bore 55 which is internally threaded and is adapted to receive therein the threaded portion 56 of the downwardly directed stud 57 extending from the insert 43 carried by the bladder.

The insert 43 includes a downwardly directed annular shoulder 58, defining a stop against which the upper face of the insert 52 may be tightened, whereby the valve member 47 may not be over-tightened upon application thereof.

In order to permit tightening of the valve member, there is formed a pair of bores 59, 60 to opposite sides of and parallel with the axis of the internally threaded portion 55 of the insert 52, the bores 59, 60 extending through the elastomeric shell of the valve 47 and into the metallic flange 53. It will be seen that by virtue of the positioning of the bores 59, 60 in the minor base portion 49, a spanner may be inserted and torque applied for mounting or demounting of the valve assembly directly to metal portions of the valve insert 52.

Figure 2:
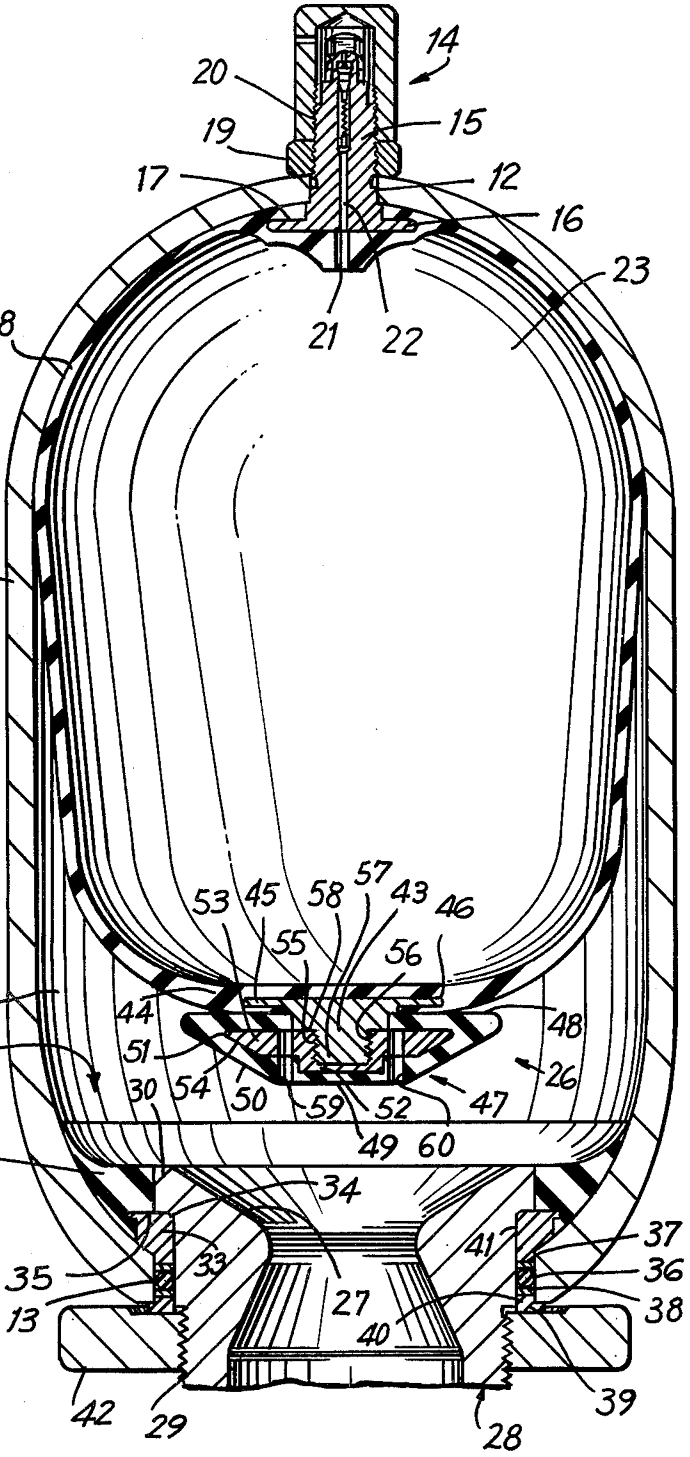
FIG. 2 is a vertical section, on a magnified scale, taken on the line 2—2 of FIG. 1.

The operation of the device will be apparent from the above description. As noted, when the pressure in the oil chamber 24 is sufficiently great, the bladder will be maintained in an intermediate position within the pressure vessel, as depicted in FIG. 2.

When the pressure within the oil chamber 24 drops, the compressed gas within chamber 23 will cause the bladder assembly to expand, and the valve assembly 26 will be projected into seated position, with the conical side wall 50 engaged against the beveled valve seat 27, to define a seal of the oil port. The seating movements of the device of the present invention will not be accompanied by any substantial sound since there is no metal-to-metal contact upon closing of the valve.

Preferably, the diameter of the major base portion 48 of the valve shell 47 is slightly less than the maximum diameter of the valve seat 27, whereby there is defined between the outer periphery of the shell 47 and the valve seat 27 a downwardly directed, V-shaped groove 61, the walls of which groove converge in a downward direction. This annular groove provides a secondary sealing area surrounding the prime sealing area provided by the valve.

Figure 3:
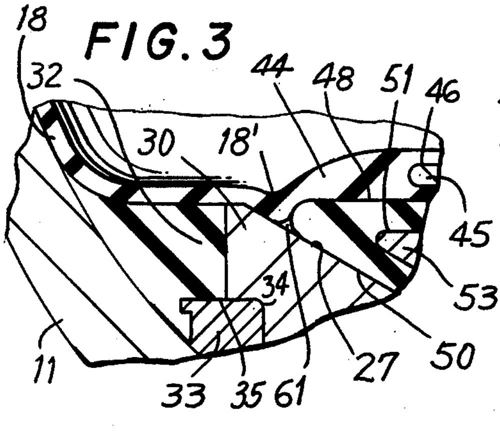
FIG. 3 is a further magnified fragmentary sectional view of portions of the valve seat and valve in the closed positions thereof.

As shown in FIG. 3, an increment 18' of the bladder surrounding the valve 26 will, under low pressure conditions within the oil chamber, be forced between the converging walls of the groove, whereby the additional sealing function is provided. The greater the pressure differential between the gas and oil chambers, the tighter the seal, by virtue of the converging configuration of the walls.

Should the valve assembly 26 become damaged, as may occur following repeated seatings or upon closing of the valves over entrained particles in the hydraulic fluid, the replacement of the valve 26 is a relatively simple task. It is merely necessary to remove the plug assembly 28 and engage the tines of a spanner wrench within the bores 59, 60, whereby the valve may be unscrewed from its connected relation to the bladder and a replacement inserted.

From the foregoing it will be recognized that there is provided an improved silent-acting hydraulic accumulator device wherein the life of the bladder is substantially extended by virtue of the replaceable nature of that component of the bladder most likely to be affected by wear, namely, the valve member.

Having thus described the invention and illustrated its use, what is claimed as new and is desired to be secured by Letters Patent is:

1. A silent acting hydraulic accumulator-pulsation dampener device comprising, in combination, a pressure vessel including a gas charging port at one end and an oil port at the other end, said oil port including a removable flared valve seat portion directed toward the interior of said vessel, a distensible elastomeric bladder assembly mounted within said vessel and dividing the same into two chambers in communication, respectively, with said oil port and said gas charging port, a metallic insert member fixed to an end portion of said bladder in opposed relation to said oil port, said insert member including a base embedded in the wall of said bladder with no portion of said insert extending into said chamber communicating with said gas charging port, a stop shoulder spaced from said base and directed toward said valve seat, and a threaded stem projecting beyond said shoulder, and a replaceable valve member mounted on said stem, said valve member comprising a frusto-conic elastomeric shell portion sized to pass through said oil port and including a major base engaging said end portion of said bladder, a minor base of smaller diameter directed toward said seat, and side walls tapered to conform to the flare of said seat, an internal, upwardly open cavity formed within said shell portion and including an undercut annular groove, and a metallic retainer member disposed within said cavity and including flange portions extending into said undercut groove to lock said retainer member to said shell, said retainer member including an axially directed, internally threaded bore in registry with said upward opening in said shell, said opening being sized to expose upwardly facing portions of said retainer surrounding said bore; said bore being threadedly connected to said stem of said insert member, with said upwardly facing portions of said retainer engaged against said stop shoulder of said insert member, whereby said shell is mounted to said end of said bladder for movement into sealing and unsealing positions of said valve seat responsive to expansion and contraction of said bladder.

2. A dampener device in accordance with claim 1 and including a pair of spaced, axially directed blind bores extending through said minor base of said shell and said flange portion of said retainer, said bores being disposed in parallel with the axis of said stem and being symmetrically spaced to opposite sides of said axis, said bores terminating short of said major base portion and providing receiver means for a torque applying member, whereby said valve member may be removed and replaced through said oil port.

3. Apparatus in accordance with claim 1 wherein the diameter of said major base portion is less than the diameter of said seat, said seat and said shell, in the sealing position of said valve in said seat, defining therebetween an annular groove, generally V-shaped in vertical section, whereby portions of said bladder surrounding said seat are stressed into said groove under conditions where the pressures in said gas chamber substantially exceed pressures in said oil chamber to define an auxiliary annular seal surrounding said seat.

* * * * *